United States Patent

[11] 3,585,588

[72] Inventors William W. Hardin
Stewartville;
Patrick J. Hurley, Rochester; Patrick J. Traglia, Rochester, all of, Minn.; Reini J. Norman, Framingham, Mass.

[21] Appl. No. 672,518
[22] Filed Oct. 3, 1967
[45] Patented June 15, 1971
[73] Assignee International Business Machines Corporation
Armonk, N.Y.

[54] SUPPLEMENTARY SCAN LEXICAL SYMBOL IDENTIFIER
4 Claims, 7 Drawing Figs.

[52] U.S. Cl. .......... 340/146.3
[51] Int. Cl. .......... G06k 9/10
[50] Field of Search .......... 340/146.3

[56] References Cited
UNITED STATES PATENTS

| | | | |
|---|---|---|---|
| 3,165,718 | 1/1965 | Fleisher | 340/146.3 |
| 3,263,216 | 7/1966 | Andrews | 340/146.3 |
| 3,303,465 | 2/1967 | Essinger et al. | 340/146.3 |
| 3,460,091 | 8/1969 | McCarthy et al. | 340/146.3 |

OTHER REFERENCES

Brown Back et al., IBM TECHNICAL DISCLOSURE BULLETIN, " High-Speed Registration For Position Code Scanning," Vol. 9 No. 11 Apr. 1967. pp. 1593— 1595.

Greanias et al., IBM JOURNAL, " The Recognition Of Handwritten Numerals By Contour Analysis," Jan. 1963. pp. 14— 21.

*Primary Examiner*—Maynard R. Wilbur
*Assistant Examiner*—Leo H. Boudreau
*Attorney*—Sughrue, Rothwell, Mion, Zinn and MacPeak

ABSTRACT: After a curve follower lexical symbol recognition system has completed a character examination and found a conflict to exist, a supplementary scan of the character is initiated only for resolving the conflict. The scan traverses across the character at a horizontal and/or vertical level at which there is an identification number of crossovers for the particular conflict. The number of crossovers solves the conflict.

INVENTORS
WILLIAM W. HARDIN
PATRICK J. HURLEY
PATRICK J. TRAGLIA
REINI J. NORMAN

BY Sughrue, Rothwell, Mion, Zinn & Macpeak

ATTORNEYS

SUPPLEMENTARY SCAN LEXICAL SYMBOL IDENTIFIER

BACKGROUND OF THE INVENTION

The invention is in the field of electronic character readers which scan lexical symbols and, from the nature of the symbols, provide indications of the symbols scanned.

Curve following character recognition systems such as the type described in U.S. Pat. No. 3,303,465, operate to follow the curve of a character, perform logic feature tests on the curves and combine the feature test results in combinatorial logic. The feature tests and some of the combinatorial logic for recognizing characters 0—9 are described in detail in Pat. 3,303,465. In the case of a conflict after the recognition sequence is complete, the system performs a "third pass" on the character. The third pass causes the beam to break through the outside contour of the character and curve follow an inside contour. The waveform generated is subjected to "third pass" feature tests which are combined in additional combinatorial logic to resolve the conflict or to finally decide that the character is unrecognizable. Details of parts of the prior art system shown generally in 3,303,465 are illustrated in U.S. Pat. Nos. 3,248,699 to Essinger et al., 3,297,989 to Atchley et al. and 3,229,100 to Greanias.

SUMMARY OF INVENTION

The present invention provides a simpler, more reliable system for use in a character recognition system for resolving conflicts and eliminates the need for the third pass feature tests of the prior art. The present invention performs a supplementary scan on the character which could not be unambiguously identified by the recognition logic. The scan is not a contour scan but is simply a vertical and horizontal scan across the character. The number of "crossovers" or "hits" is counted and used to identify the character. The position of the horizontal and vertical scan across the character depends upon the type of conflict. For example, for an 8—9 conflict, the beam is made to scan horizontally across the lower part of the character. If there are two "hits" counted, the character is an eight; if there is one hit recorded, the character is a nine. In this type of conflict the vertical scan would not even be necessary to resolve the conflict, but it should be apparent that for other types of conflicts a vertical scan alone will resolve the conflict. For a 7—9 conflict a vertical scan along the left side of the character will identify the 7 (one hit) or the 9 (two hits).

In the following description and claims unless it appears otherwise, the word "conflict" is used broadly to mean that the character was unrecognizable by the curve follower system. The conflict could represent the coincident recognition of two or more characters, the almost, but not quite, recognition of a single character, or even the almost recognition of two characters. As will be obvious to anyone of ordinary skill in the art, the conflict conditions are generated by logically combining the feature tests of the curve follower system which would apply to the particular conflict.

DETAILED DESCRIPTION OF THE DRAWINGS

Throughout the detailed description of the drawings one example of a preferred embodiment of the present invention will be described. The logic shown will be described in accordance with conventional positive logic although it is not intended to be limited to positive logic. It will also be pointed out specifically how some types of conflicts are resolved and generally how others are resolved. However, from the description given it will be apparent to anyone having ordinary skill in the art how other possible conflicts can be resolved by the present invention.

Figures 1, 2:
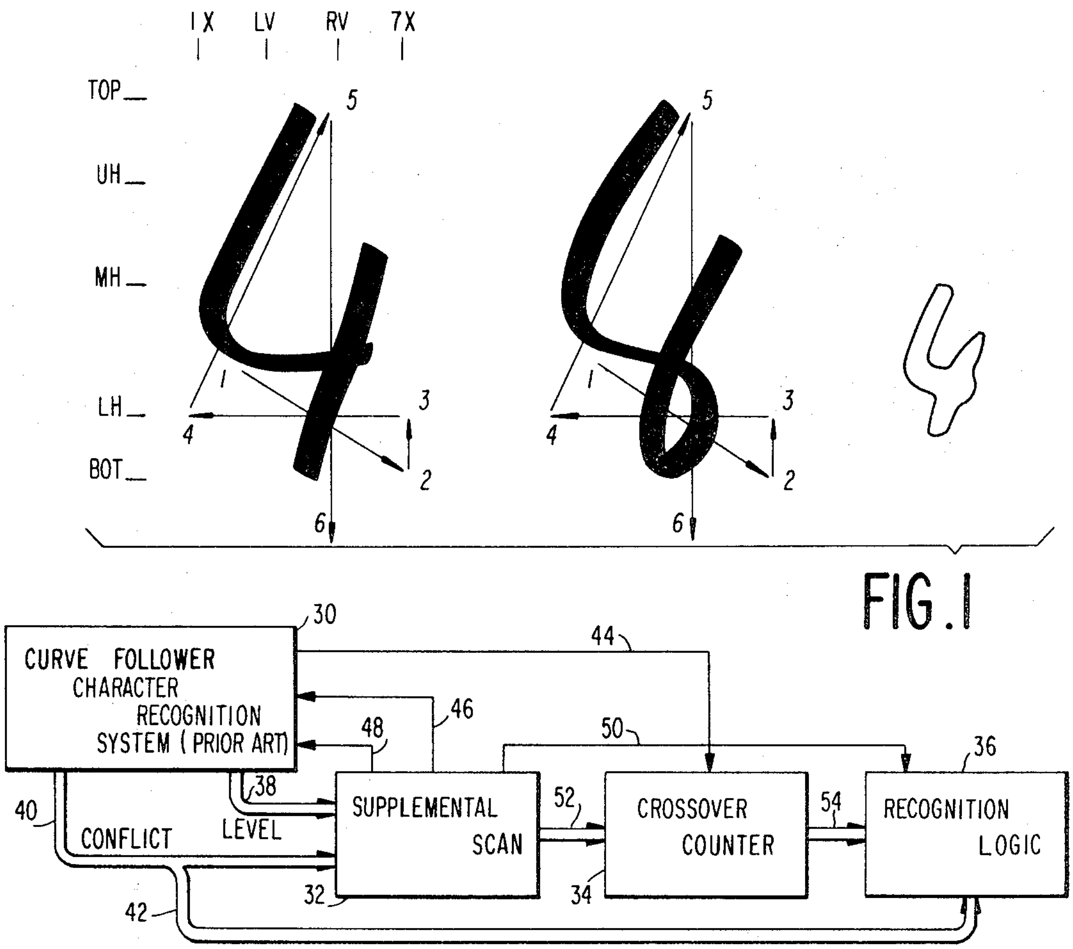
FIG. 1 shows one type of conflict and the outer contour seen by the prior art curve follower.
FIG. 2 is a block diagram showing the relationship of the functional parts of the present invention and the prior art contour scanner.

Referring now to FIG. 1 there is shown one specific type of conflict, referred to herein as the 4—8 conflict. The left solid character is a lexical 4, the middle solid character is a lexical 8. For either of the two solid characters of the form shown, the recognition system of the prior art (U.S. Pat. No. 3,303,465) will see substantially the same outline. The outline is shown by the symbol on the right of the drawing. Thus, the character recognition system, after the second pass, will not know whether it is examining a four or an eight.

Upon the termination of the second pass in the recognition system and a notification that a conflict has occurred the present invention causes the scanner to trace across the character at a level which will enable resolution of the conflict. The sequence of the scan, referred to herein as the supplementary scan, is illustrated by the arrows in FIG. 1.

Before describing the supplementary scan, it should be noted that in the character recognition system of the prior art all characters are normalized after the first pass of the curve follower. Normalization is performed by a matrix resolver, an example of which is shown in U.S. Pat. No. 3,248,699 to Essinger et al. Normalization effectively removes overall size as an identifying factor and enables the electronics to "see" all characters as being of the same size. The electronic normalized matrix is illustrated best in FIGS. 5A through 8A of U.S. Pat. No. 3,303,465 to Essinger et al. and is created by putting the maximum and minimum voltages of the vertical and horizontal beam excursions during the first pass onto vertical and horizontal voltage dividers.

For the supplementary scan it is not necessary to use all of the area identifying signals from the matrix resolver. It is only necessary to identify certain levels within the character field. For the specific embodiment described herein it is necessary to identify five horizontal levels, including the top and bottom, and four vertical levels, including the right and left boundaries. The levels are illustrated by the dash marks associated with the solid line 4 character of FIG. 1. The horizontal levels and their identifying symbols are: top (TOP); upper horizontal (UH); middle horizontal (MH); lower horizontal (LH); and bottom (BOT). The vertical levels are: right boundary (7X); right vertical (RV); left vertical (LV); and left boundary (1X).

Figure 4:
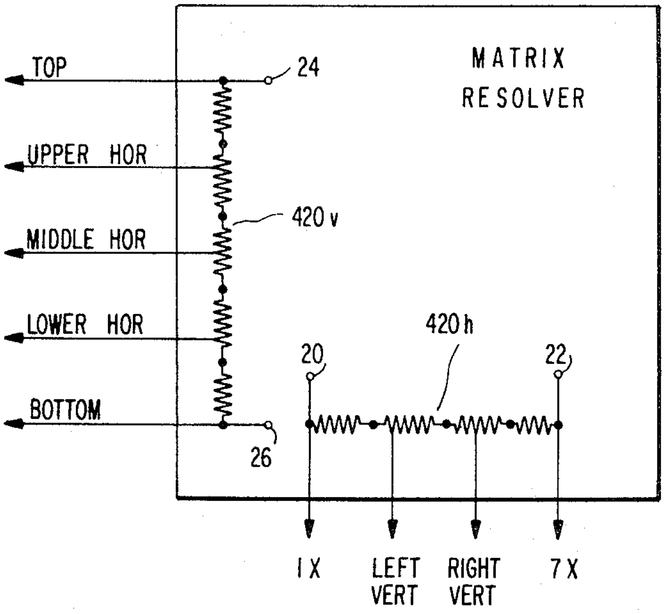
FIG. 4 is a partial schematic illustrating the generation of other control inputs from the matrix resolver of the prior art.

It will be apparent to anyone having ordinary skill in the art that voltages for identifying the levels may be obtained by tapping the voltage divider of the matrix resolver at convenient points. An example is shown in FIG. 4, where the block represents the matrix resolver of FIG. 2 of U.S. Pat. No. 3,248,699 to Essinger et al.

The only elements shown in detail are the voltage dividers 420*h* and 420*V*. The voltages in hubs 22 and 20 represent the maximum and minimum excursions of the first pass scan along the *x* axis, and the voltages on hubs 24 and 26 represent the maximum and minimum excursions of the first pass scan along the *y* axis. The level identifying voltages necessary for the supplementary scan could be tapped off at points as indicated in the drawing.

Referring back to FIG. 1, the numeral 1 identifies the point at which the recognition scan comes to rest after completion of the second pass. The actual position of this point is not important. Upon initiation of the supplementary scan logic, the trace is caused to move in the following manner.

1. The trace is moved right and down until it reaches the bottom of the character (BOT) and the right boundary (7X). This is indicated by the arrow between points 1 and 2.

2. Next the trace moves up the 7X boundary until it reaches the selected level. The selected level will be either LH, MH or UH, and is selected by logic which responds to the particular conflict. For the illustrated 4—8 conflict, the LH level is selected. This is illustrated by the arrow between points 2 and 3.

3. The trace is then moved horizontally across the character until it reaches the 1X boundary as indicated by the arrow between points 3 and 4. During this scan the crossovers from white to black (known as hits) are accumulated in a horizontal counter.

4. The trace is next moved up and to the right. The upward movement stops when TOP is reached and the right movement is stopped at a level dependent on the type of conflict. The level could be LV, RV or 7X. This scan is indicated by the arrow between points 4 and 5.

5. The last movement of the trace in the supplemental scan is vertically down to the BOT level. This is indicated by the arrow between points 5 and 6. During the latter trace the crossovers are counted in a vertical counter.

The preferred embodiment is arranged so that the horizontal and vertical crossovers in steps 3 and 5 above are counted for all conflicts, even though only one or the other may be necessary to resolve the conflict. For example, in the 4—8 conflict only the horizontal crossovers are needed to identify the 4 or 8. If there are two crossovers, the character is an eight; if there is one crossover the character is a four.

In FIG. 2 there is shown a functional block diagram of the invention and its relation to the prior art curve follower character recognition system 30. The interconnections to the prior art system are only shown generally since the specific terminals to which the leads would be connected would be obvious to anyone of ordinary skill in the art and it would be superfluous to repeat drawings already known in the prior art.

Figure 7:
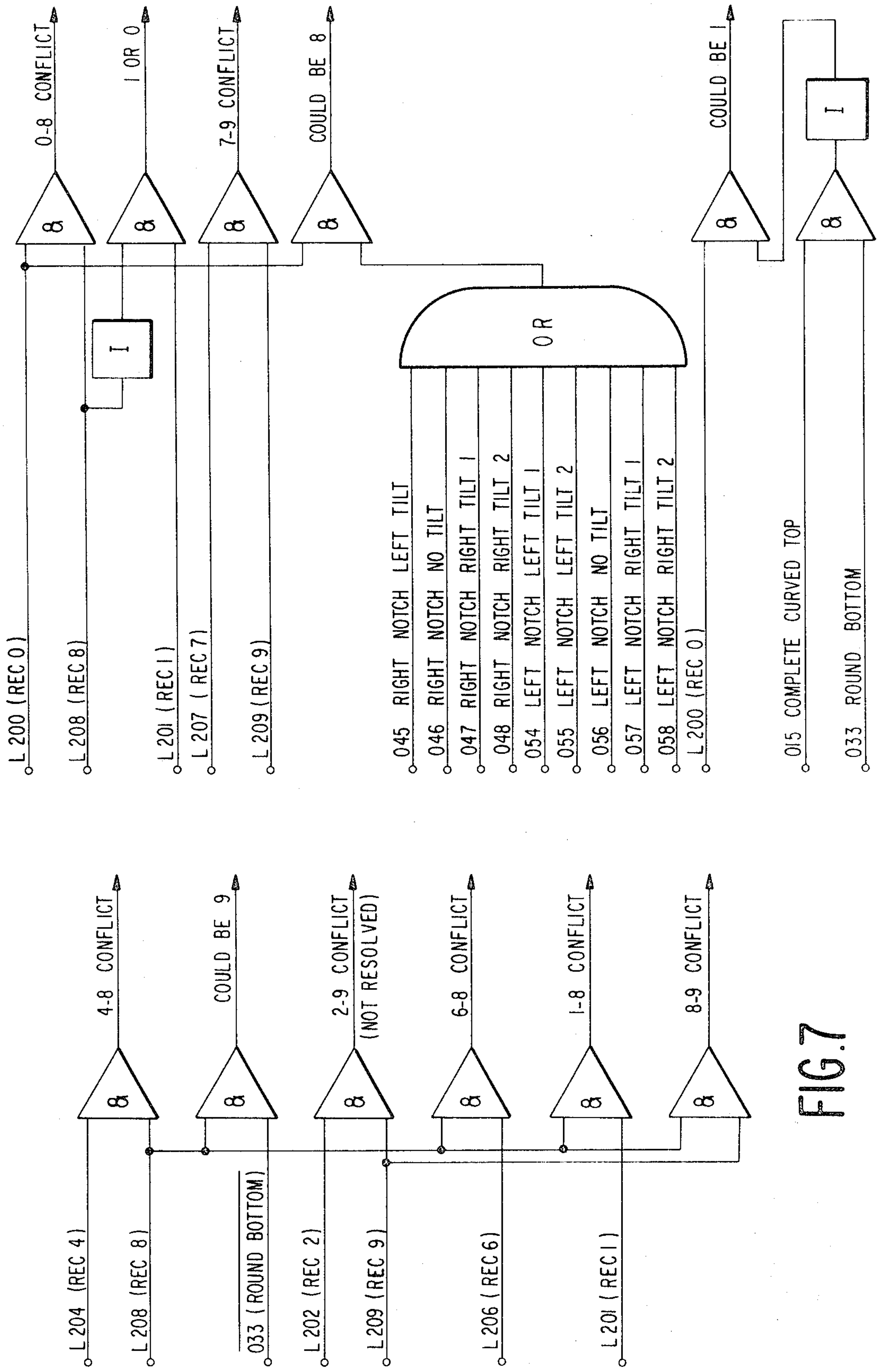
FIG. 7 is a block diagram of logic for generating the conflict indications from conditions generated in the prior art system.

The conflict identifications at the end of a second pass in system 30 are sensed by the supplemental scan unit 32 via leads 40. The particular manner in which the conflicts are determined by the system 30 forms no part of the present invention since it is a function of the present invention to resolve a conflict once an indication is given and not to generate the conflict indicating signal. However, for the purpose of aiding the description of the specific embodiment of the invention the logic which will respond to the latch and feature test outputs of the prior art to indicate certain conflicts is shown in FIG. 7. The inputs to the gates are from the hardware shown in Pat. 3,303,465. Specifically, the LXX inputs are from the recognition latches of the same number, and the OXX inputs are the feature tests. All triangular-shaped elements are AND functions, all half moon-shaped elements are OR functions, and all boxes with I in the middle are invert functions. The logic is self-explanatory to anyone of ordinary skill in the art and will not be discussed further herein.

Referring back to FIG. 2, in response to the conflict indications the supplemental scan unit 32 provides vertical and horizontal controlling voltages to move the trace in a manner described in connection with FIG. 1. The horizontal and vertical controlling voltages are applied to system 30 via leads 46 and 48 respectively. The supplemental scan unit 32 also receives the level voltages via leads 38. The latter voltages may be derived from the matrix resolver in the manner described in connection with FIG. 4.

The crossover counters 34 are controlled by the supplemental scan unit 32 via leads 52 to count the video pulses corresponding to crossovers received via lead 44. The number of crossovers and the conflict indications are logically combined in recognition logic 36 to resolve the conflict at the end of the supplemental scan.

Figures 3, 5:
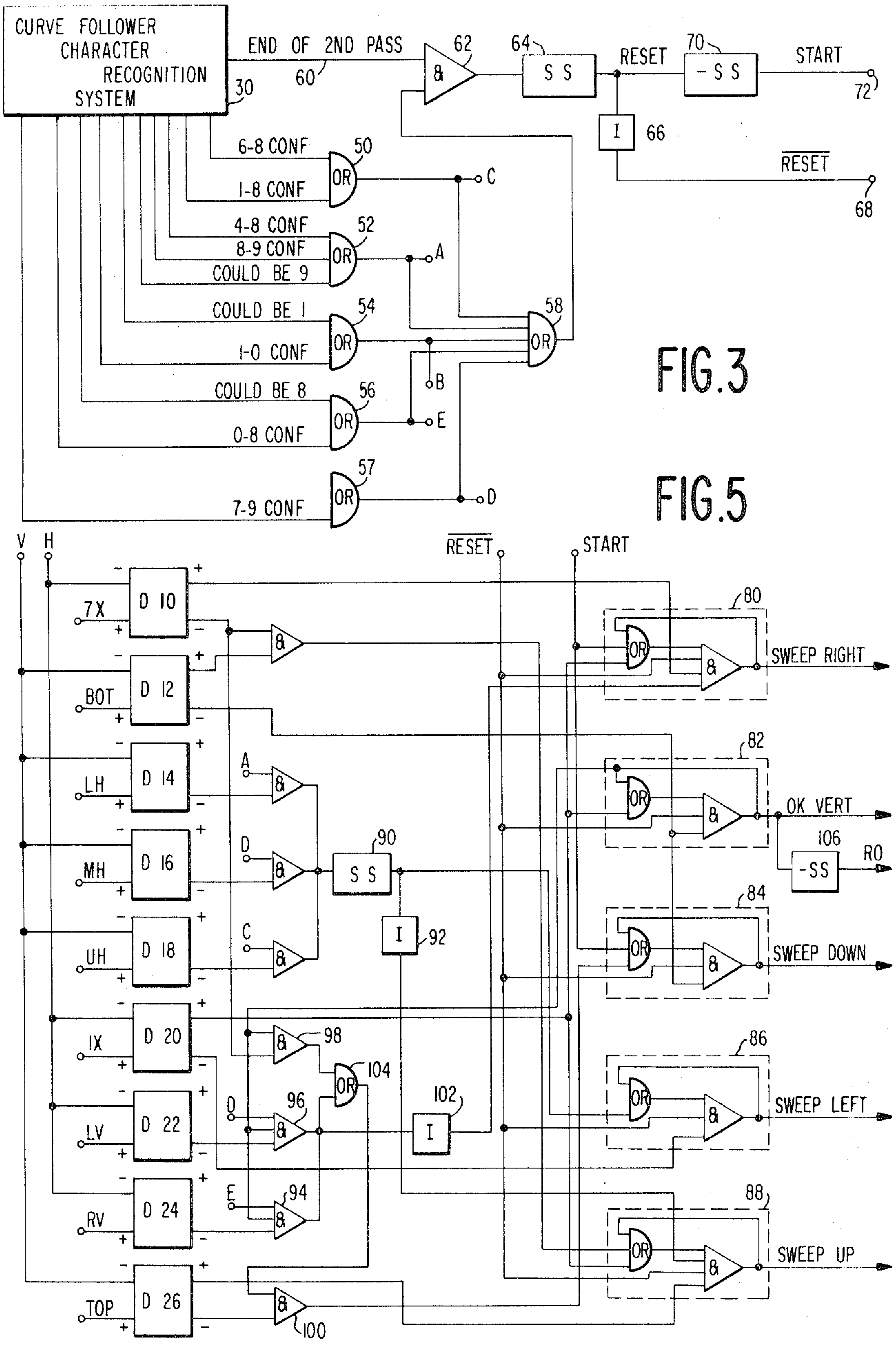
FIG. 3 is a block diagram of a part of the system logic for generating initiating, and other control inputs.
FIG. 5 is a block diagram of the logic which commands the scanner to scan the desired pattern.
Figure 6:
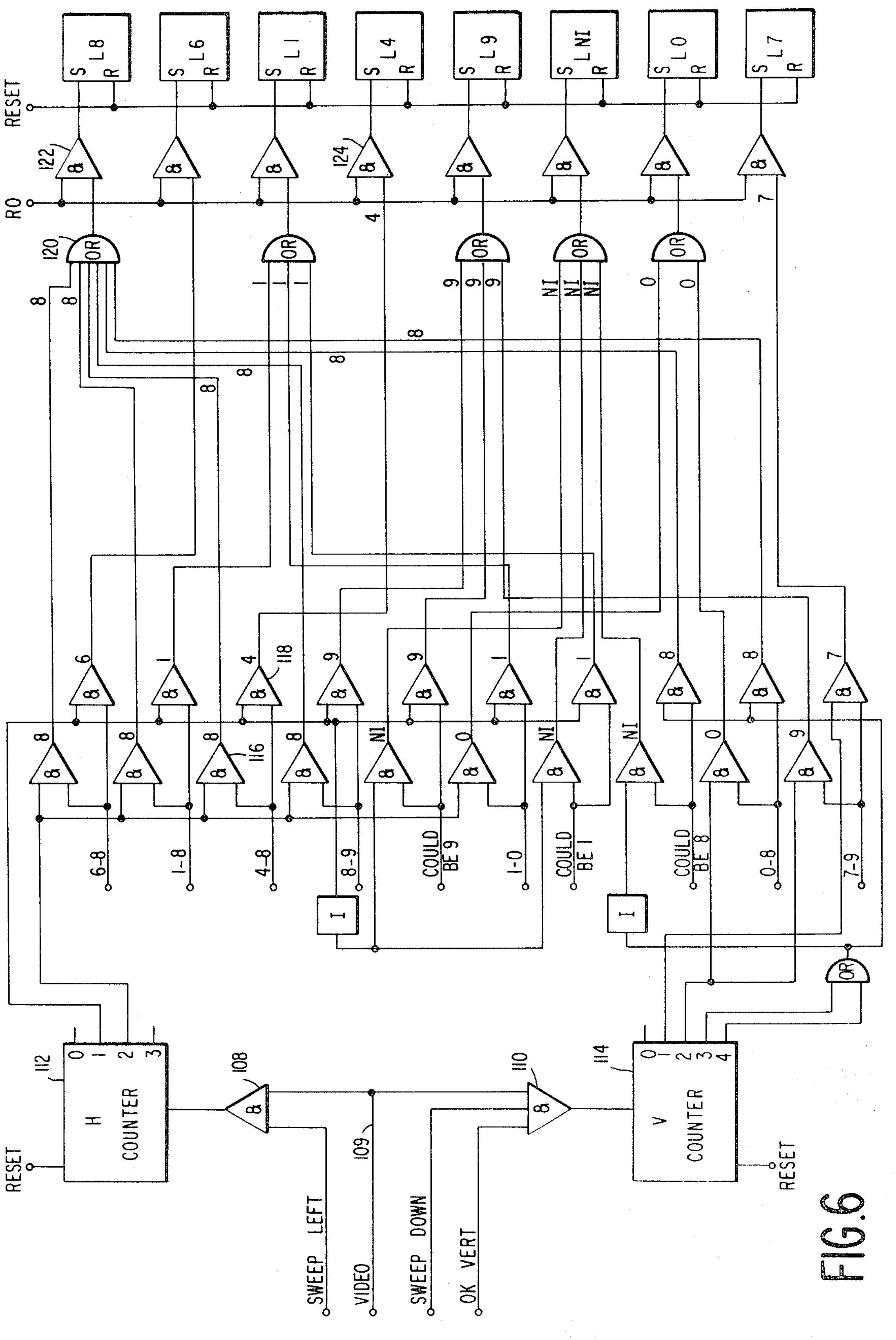
FIG. 6 is a block diagram of an example of the recognition logic and crossover counter for examples of conflicts.

A detailed example of the logic for resolving the conflict is shown in FIGS. 3, 5 and 6. In FIG. 3 the conflict indications are divided into five groups by OR gates 50 through 57. They are grouped according to the level across which an identifying scan is to be made. For example, the 6—8 and 1—8 conflicts have identifying numbers of crossovers across the upper horizontal level, therefore the output C is used in subsequent logic to select the UH level for a horizontal scan. All of the outputs A–D are used to select a level to be traversed by the scan. The latter outputs are also passed to an OR gate 58, the output thereof indicating that a conflict exists.

At the end of the second pass around the character by the system 30, a termination output is ANDed with the conflict indication in gate 62, the output therefrom triggering single shot 64 to provide a positive RESET output pulse. The RESET output pulse is applied to a single shot 70 which responds to the trailing edge of the RESET output pulse to generate a START pulse.

The START, $\overline{\text{RESET}}$ and A—D outputs are used to control the logic of FIG. 5 which operates to select the levels of the character to be scanned. There are five latches shown in FIG. 5. The SWEEP RIGHT latch 80, SWEEP DOWN latch 84, SWEEP LEFT latch 86 and SWEEP UP latch 88 control the electron beam of the scanner of the prior art system to move in the indicated direction. Controlling a cathode ray beam in any direction in accordance with the command outputs of the latches will be obvious to anyone having ordinary skill in the art.

The fifth latch, labeled OK VERT latch 82 provides a condition output which is used as a gating input for the vertical counter as shown in FIG. 6. All of the latches 82—86 include an AND gate and an OR gate. A latch is SET by a positive input to the OR gate and is RESET by a negative input to the AND gate.

The logic of FIG. 5 also includes nine discriminators D10—D26, one for each level voltage picked off the voltage dividers of FIG. 4. Each discriminator has a level voltage applied to one input and either a vertical or horizontal voltage applied to the second input. The vertical and horizontal voltages are at all times proportional to the vertical and horizontal position of the scan, and, as is well known in the art, may be tapped off the input to the vertical and horizontal deflection plates or coils. The purpose of each discriminator is to provide an electronic indication when the scan reaches the level corresponding to the voltage level input to the discriminator.

Although many kinds of discriminators can be used in the logic of the invention, the ones described in the specific embodiment herein operate to provide positive and negative outputs on the opposite output terminals for one relative amplitude condition of the inputs, and to provide the reverse outputs for an opposite relative amplitude condition of the inputs. Specifically, when the voltage on the minus input terminal is below the voltage on the positive input terminal, the voltages on the output terminals have the polarity indicated by the signs. Otherwise, the upper output terminal will be negative and the lower output terminal will be positive.

The inputs A—C, from FIG. 3, are ANDed with the outputs from the LH, MH and UH discriminators to select the level for a horizontal scan. The inputs D and E are ANDed with the outputs from the LV and RV discriminators to select the level for a vertical scan.

A complete supplementary scan is accomplished as follows: When a $\overline{\text{RESET}}$ is generated by the single shot 64 (FIG. 3), the $\overline{\text{RESET}}$ input to latches 80—88 becomes negative thereby resetting all latches. When RESET becomes positive a START pulse is generated and applied to SWEEP RIGHT latch 80 and SWEEP DOWN latch 84, setting those latches and causing the scan to move from the start position toward the right and down.

When the scan reaches the 7X boundary the upper output of D10 becomes negative and resets latch 80 stopping the movement to the right. When the scan reaches the BOT level the lower output of D12 goes negative resetting latch 84 to stop the downward movement of the scan. The first step of the supplemental scan ends at the 7X and BOT boundaries. Under these conditions the lower output of D10 is positive and the upper output of D12 is positive. The latter outputs are ANDed and applied to the OR gate of latch 88 to start a scan in the up direction.

The up scan, indicated by the arrow between points 2 and 3 in FIG. 1, is stopped at level LH, MH or UH depending upon which of the inputs A through C is selected. For the 4—8 conflict, input A is positive and thus, the LH level is selected. When the scan reaches the LH level, the lower output of D14 becomes positive and is ANDed with input A to trigger single shot 90 to provide a relatively short positive output pulse. The positive output pulse may be on the order of a few nanoseconds. The positive pulse is inverted by invertor 92 thereby causing the SWEEP UP latch to be reset. At the same time the positive pulse from single shot 90 sets the SWEEP LEFT latch 86 causing the scan to proceed across the character at the selected level. The purpose of providing a single shot 90 is to allow the SWEEP UP latch 88 to be set during a later step even though the scan is above the selected horizontal level.

When the scan reaches the 1X boundary, the lower output of D20 resets latch 86 and the upper output of D20 sets latches 80, 88 and 82. Latches 80 and 88 cause scanning to proceed to the right and upward, and latch 82 provides conditioning inputs to AND gates 94 through 98.

When the scan reaches the TOP level, the upper output of D26 resets SWEEP UP latch 88 and the lower output provides one positive input to AND gate 100. The movement to the right is stopped at the LV level if D is positive, at the RV level if E is positive or at the 7X level if neither D nor E is positive. If D is positive, when the scan reaches level LV a positive output from AND gate 96 is inverted by invertor 102 to reset SWEEP RIGHT latch 80. If E is positive a similar operation takes place. If neither is positive, when the scan reaches the 7X level, the upper output of D10 resets the SWEEP RIGHT latch 80. In all three cases, a positive input will appear at OR gate 104 thereby providing a second positive input to AND gate 100. The output of AND gate 100 sets the SWEEP DOWN latch 84 thereby starting the vertical scan during which crossovers are counted.

When the scan reaches the BOT level, the lower output of D12 resets latches 84 and 82 stopping the downward scan and removing the positive conditioning signal OK VERT. As OK VERT goes negative a single shot 106 responsive to the negative going input provides a read out output pulse RO of predetermined duration. The RO pulse enables the read out circuitry. Although not shown in the drawing, the RO pulse may be inverted and applied to the AND gates of all latches 80—88 to insure that all latches are reset following the vertical scan.

The counters and associated logic are shown in FIG. 6. The logic is self-explanatory and thus only the resolution of the 4—8 conflict will be described in detail. The output latches are set in accordance with the character identified. For example if an eight is identified, latch L8 is set, if a four is identified latch L4 is set. When there is no identification at the end of a supplementary scan, latch LNI is set. The horizontal counter 112, vertical counter 114 and all latches are reset by the RESET pulse input.

The video pulses, corresponding to crossovers in the scans, are generated by the prior art recognition system and applied to AND gates 108 and 110 via lead 109. During the scan across the character at the selected horizontal level, the SWEEP LEFT input from latch 86 (FIG. 5) energizes AND gate 108 to pass the video pulses to horizontal counter 112. Thus, the horizontal counter registers the number of crossovers during the horizontal scan. During the vertical scan across the character at the selected level, latches 84 and 82 (FIG. 5) are set thereby providing energization of AND gate 110. Thus, vertical counter 114 registers the crossovers during the vertical scan.

For the 4—8 conflict of FIG. 1, the vertical count is unimportant. If the character is an eight, the counter 112 will register a count of two. The two count output of counter 112 is ANDed with the 4—8 conflict line in gate 116, whose output is applied through OR gate 120 to AND gate 122. When the RO pulse occurs, an output from AND gate 122 sets latch L8 indicating that the character is an eight.

If the character is a four, counter 112 provides an output at the one count terminal which is ANDed in AND gate 118 with the 4—8 conflict line. When the RO pulse occurs the output from gate 118 passes through gate 124 to set latch L4 thereby indicating that the character is a four.

In the above description of the invention it was pointed out that the type of conflict selects the levels to be scanned for resolution of the conflict. However, it will be noted from FIG. 3 that neither A, B nor C is selected by a 0—8, 7—9, or could be 8 conflict and therefore there will be no selection of a horizontal level. Since the horizontal level is unimportant for the latter conflicts, any one of the outputs A, B or C can be selected. This is accomplished by tying the latter conflict lines to any one of the inputs to OR gates 50, 52 or 54.

While the invention has been particularly shown and described with reference to a preferred embodiment thereof, it will be understood by those skilled in the art that various changes in form and details may be made therein without departing from the spirit and scope of the invention.

What we claim is:

1. Apparatus for resolving a conflict in the identification of a lexical character comprising;

means responsive to each of a plurality of conflict identification signals for scanning the character in a different one of a plurality of different scan patterns for each conflict signal, each scan pattern effecting a scan across a portion of the character which has a unique detectable quality for each possible solution to said conflict, said unique detectable quality being number of crossovers, and means responsive to said conflict identification and said unique detectable quality for providing a solution to the conflict, wherein said means for scanning comprises, means for electrically dividing the field of said characters into plural separate levels, means responsive to said conflict identification for selecting a level in which an identifying number of crossover points exists for the conflict, and means responsive to said selected level for scanning across said character at said selected level.

2. Apparatus as claimed in claim 1 wherein said electrically dividing means divides said field into groups of substantially orthogonal levels.

3. Apparatus for resolving a conflict in the identification of a lexical character comprising;

means responsive to each of a plurality of conflict identification signals for scanning the character in a different one of a plurality of different scan patterns for each conflict signal, each scan pattern effecting a scan across a portion of the character which has a unique detectable quality for each possible solution to said conflict, said unique detectable quality being number of crossovers, and means responsive to said conflict identification and said unique detectable quality for providing a solution to the conflict, wherein said means for scanning comprises;

a. first logic means responsive to said conflict for selecting one of a group of conditioning signals each representing a different level of the field of said character, the signal selected representing a level across which are a different number of crossovers for each possible solution to said conflict, b. means for generating electrical level signals corresponding to said different levels for every character being examined, c. means responsive to any conflict identification for causing a predetermined first scan in the field of said character and for providing voltage indications of the position of said scan, d. means responsive to said position indication voltages, said electrical level signals, and said selected conditioning signal representing a selected level for terminating said first scan and for causing a second scan across said character at said selected level when said scan reaches said selected level, and e. means for counting the number of crossovers encountered by said second scan.

4. Apparatus for resolving a conflict in the identification of a lexical character comprising;

means responsive to each of a plurality of conflict identification signals for scanning said character in a different one of a plurality of different scan patterns for each conflict signal, each scan pattern effecting a scan across a portion of the character which has a unique detectable quality for each possible solution to said conflict, said unique detectable quality being number of crossovers, and means responsive to said conflict identification and said unique detectable quality for providing a solution to the conflict, wherein said means for scanning comprises, a. means for generating horizontal and vertical control voltages for controlling the position of a scan character, b. means for generating normalized horizontal level voltages and normalized vertical level voltages corresponding to various horizontal and vertical levels of said character, c. a plurality of vertical discriminator means, each responsive to one vertical level voltage and the voltage corresponding to the vertical position of said scan for providing an indication when said scan reaches said one vertical level, d. a plurality of horizontal discriminator means, each responsive to one horizontal level voltage and the voltage corresponding to the horizontal position of said scan for providing an indication when said scan reaches said one horizontal level, e. means responsive to the presence of a conflict for causing said control voltage generating means to move said scan in a predetermined pattern, f. means responsive to said conflict identification for selecting one vertical and one horizontal discriminator, g. means responsive to said horizontal discriminator indication that said scan has reached said one horizontal level for causing said control voltage generating means to move said scan across said character at said one horizontal level, and h. means responsive to said vertical discriminator indication that said scan has reached said one vertical level for causing said control voltage generating means to move said scan across said character at said one vertical level.